United States Patent
Jaeger et al.

(10) Patent No.: US 8,073,946 B1
(45) Date of Patent: Dec. 6, 2011

(54) MONITORING OF METRICS TO IDENTIFY ABNORMALITIES IN A LARGE SCALE DISTRIBUTED COMPUTING ENVIRONMENT

(75) Inventors: Juliana Jaeger, Mountain View, CA (US); Vivek Gupta, San Jose, CA (US); Hsi-Guang Sung, Mountain View, CA (US)

(73) Assignee: Google Inc., Mountain View, CA (US)

( * ) Notice: Subject to any disclaimer, the term of this patent is extended or adjusted under 35 U.S.C. 154(b) by 110 days.

(21) Appl. No.: 12/542,477

(22) Filed: Aug. 17, 2009

(51) Int. Cl.
*G06F 15/16* (2006.01)
(52) U.S. Cl. ........................ 709/224; 370/229
(58) Field of Classification Search .................. 709/224; 370/229
See application file for complete search history.

(56) References Cited

U.S. PATENT DOCUMENTS
2006/0176824 A1* 8/2006 Laver et al. .................. 370/241

OTHER PUBLICATIONS

Conover, W.J., "Practical Nonparametric Statistics," 1971, New York: John Wiley & Sons, Title page, Publication page, and pp. 295-314.
Freedman et al., "Statistics 2nd ed.," 1991, New York: W.W. Norton & Company, Title page, Publication page, and pp. 442-449.

* cited by examiner

*Primary Examiner* — David Lazaro
(74) *Attorney, Agent, or Firm* — Shumaker & Sieffert, P.A.

(57) ABSTRACT

Methods and apparatus, including computer program products, implementing and using techniques for finding application latency degradation causes in an application on a distributed computing system. Variables associated with the application and the computing system are identified, including variables that are candidates for being responsible for latency degradation. A total latency is divided into latency components, that each corresponds to an aspect of the total application latency. Each latency component is divided into study classes, that each includes a subset of the candidate variables. For each study class, combinations are generated for the subset of the variables; a latency distribution is determined for each variable combination; the determined latency distributions for the combinations are compared with corresponding latency benchmark values for the same combinations to determine whether a degradation in latency distributions has occurred for particular combinations among the one or more combinations, and a result is provided to a user.

23 Claims, 6 Drawing Sheets

--------- Forwarded message ---------  〉 402
Subject: Latency alert: XX Server - by Release & Latency Class.

Scores (Digest):
release_number_compose: 17 % weighted avg, 65 % probability (11 alarms / 17 studies)
release_number_cv: 10 % weighted avg, 34 % probability (14 alarms / 41 studies)
release_number_delete: 4 % weighted avg, 29 % probability (8 alarms / 28 studies)
release_number_label: 4 % weighted avg, 28 % probability (11 alarms / 40 studies)   404
release_number_search: 4 % weighted avg, 27 % probability (11 alarms / 41 studies)
release_number_send: 5 % weighted avg, 29 % probability (12 alarms / 41 studies)
release_number_tl: 6 % weighted avg, 36 % probability (15 alarms / 42 studies)
release_number_tl_flip: 5 % weighted avg, 33 % probability (13 alarms / 39 studies)
release_number_tl_load: 8 % weighted avg, 38 % probability (15 alarms / 40 studies)
Details of studies related to these alarms are available here.
List of alarms generated:

Observation: release_number_compose_domain_A_target observed latency increase of
23.000000 % compared to Observation:release_number_compose_domain_A_benchmark
Observation: release_number_compose_domain_B_target observed latency increase of
19.000000 % compared to Observation:release_number_compose_domain_B_benchmark
Observation: release_number_compose_domain_C_target observed latency increase of
11.000000 % compared to Observation:release_number_compose_domain_C_benchmark
Observation: release_number_compose_domain_D_target observed latency increase of
21.000000 % compared to Observation:release_number_compose_domain_D_benchmark
Observation: release_number_compose_domain_E_target observed latency increase of
13.000000 % compared to Observation:release_number_compose_domain_E_benchmark   406
Observation: release_number_compose_domain_F_target observed latency increase of
46.000000 % compared to Observation:release_number_compose_domain_F_benchmark
Observation: release_number_compose_domain_G_target observed latency increase of
11.000000 % compared to Observation:release_number_compose_domain_G_benchmark
Observation: release_number_compose_domain_H_target observed latency increase of
6.000000 % compared to Observation:release_number_compose_domain_H_benchmark
Observation: release_number_compose_domain_J_target observed latency increase of
76.000000 % compared to Observation:release_number_compose_domain_J_benchmark
Observation: release_number_compose_domain_K_target observed latency increase of
35.000000 % compared to Observation:release_number_compose_domain_K_benchmark
Observation: release_number_compose_domain_M_target observed latency increase of
22.000000 % compared to Observation:release_number_compose_domain_M_benchmark

Daily Latency Regressions at CL check-in time
Latency increase tolerance: 5 %

| Latency Test Summary: | | | | | | | | |
|---|---|---|---|---|---|---|---|---|
| CL | CDF Graph | Mean Graph | CLs Graph | Agent | Action | Mean (ms) | % Mean Increase | Time |
| 9147913 | CDF | Mean | Adj CLs Mean | Firefox 3.0 | cv-o-tl | 1507.0 | N/A | Tue Nov 25 00:36:04 2008 |
| 9147913 | CDF | Mean | Adj CLs Mean | MSIE 7.0 | cv-o-tl | 3556.0 | N/A | Tue Nov 25 00:36:04 2008 |
| 9147913 | CDF | Mean | Adj CLs Mean | Firefox 3.0 | tl-i-uk | 5261.0 | N/A | Tue Nov 25 00:36:04 2008 |
| 9147913 | CDF | Mean | Adj CLs Mean | MSIE 7.0 | tl-i-uk | 10054.0 | N/A | Tue Nov 25 00:36:04 2008 |
| 9148711 | CDF | Mean | Adj CLs Mean | Firefox 3.0 | cv-o-tl | 878.0 | -19.000000 | Tue Nov 25 14:21:11 2008 |
| 9148711 | CDF | Mean | Adj CLs Mean | MSIE 7.0 | cv-o-tl | 2071.0 | -8.000000 | Tue Nov 25 14:21:11 2008 |
| 9148711 | CDF | Mean | Adj CLs Mean | Firefox 3.0 | tl-i-uk | 4131.0 | 4.000000 | Tue Nov 25 14:21:11 2008 |
| 9148711 | CDF | Mean | Adj CLs Mean | MSIE 7.0 | tl-i-uk | 6873.0 | -26.000000 | Tue Nov 25 14:21:11 2008 |
| 9148711 | CDF | Mean | Adj CLs Mean | Firefox 3.0 | tl-lc-tl | 994.0 | 12.000000 | Tue Nov 25 14:21:11 2008 |
| 9148711 | CDF | Mean | Adj CLs Mean | MSIE 7.0 | tl-lc-tl | 1289.0 | 5.000000 | Tue Nov 25 14:21:11 2008 |

MONITORING OF METRICS TO IDENTIFY ABNORMALITIES IN A LARGE SCALE DISTRIBUTED COMPUTING ENVIRONMENT

BACKGROUND

This invention relates to large-scale computing systems. Latency is one of the more important problems to address in large-scale, distributed computing systems. In general, latency can be defined as the period of time that a component in a computing system is waiting for another component. Latency can therefore be considered "wasted time," and is consequently undesirable. On an individual computer, latency is typically low and of little concern to the computer user, but on a large-scale distributed computing system with millions of users, it is desirable to minimize latency so that each user experiences the system as being responsive to their requests. In order to minimize latency, it is important to identify when latency degradations occur and to find potential causes for the latency degradations so that relevant alerts can be sent to administrators and other parties that are interested in the health of the computing system, so that they can take the appropriate actions to address the latency degradations.

One example of a large-scale distributed computing system is a system that is used to host an electronic mail (email) system. For example, the hosted email application "Gmail" is available from Google Inc. of Mountain View, Calif., and is run on a large distributed system. The application has millions of users and serves a very large number of requests every day on many computers. Each of these requests has some associated variables, for example, the browser used by the user, the location of the user, the location of the Gmail cluster serving the user, the action the user is taking (for example, sending mail, reading mail, and so on), just to mention a few variables. Each of these variables has a set of possible values, which can affect the latency of the requests, either by itself or in interaction with other variables. As can be realized, there can be several million of possible variable value combinations that may explain any latency degradations in the computing system. Given this, it is prohibitively computationally expensive to enumerate all the possibilities.

Thus it would be desirable to have improved techniques for navigating a large search space to find potential latency degradations and the variables that are responsible for causing the latency degradations. At the same time, it is also desirable to use computing resources efficiently, and to generate a relatively small number of meaningful alerts that can be appropriately addressed.

SUMMARY

In general, in one aspect, the various embodiments provide methods and apparatus and systems, including computer program products, implementing and using techniques for finding causes of a latency degradation in an application running on a distributed computing system. A set of variables associated with the application and the distributed computing system is identified. The set of variables includes variables that are candidates for being responsible for latency degradation in the application or computing system. A total latency is divided into two or more latency components, where each latency component corresponds to a particular aspect of the total application latency. Each latency component is divided into two or more study classes, where each study class includes a subset of the variables that are candidates for being responsible for latency degradation for the latency component. For each study class, one or more combinations of the variables in the subset of the variables are generated; a latency distribution is determined for each of the one or more combinations of the variables; and the determined latency distributions for the one or more combinations are compared with corresponding latency benchmark values for the same combinations to determine whether a degradation in latency distributions has occurred for particular combinations among the one or more combinations. A result of the comparison is provided to a user.

Various implementations can include one or more of the following features. An alert can be generated in response to determining that the degradation in latency for a particular combination exceeds a threshold value. Multiple alerts can be aggregated to reduce the number of alerts; the aggregated alerts can be presented to the user. The latency components can be based on features of the distributed computer system and include server latency, client latency and/or network latency. The latency components can be based on high-level operations that are supported by the application running on the distributed computer system. The one or more combinations can include a set of main variables being suspected to be responsible for the latency degradation, and a set of control variables that constitute a sampling of values of the remaining variables in the study class.

The one or more combinations can be enumerated and the control variables can be selected by performing a random sampling from all possible combinations of variable values. Determining a latency can include selecting one or more benchmark distributions from a set of previously generated latency measurements for the one or more combinations, and performing latency measurements for the one or more combinations corresponding to the selected one or more benchmark distributions. The one or more benchmark distributions can be past winners in a set of measurements for the one or more combinations during a prior time period. Comparing the determined latency and the benchmark values can be done using one or more of: a parametric test, and a non-parametric test. The one or more parametric and non-parametric tests can include a Kolmogorov-Smirnov test and/or a Student's T-test.

Various implementations can include one or more of the following advantages. Latency problems can be responded to with a short lead time, which leads to savings in time and engineering resources that would otherwise be spent on manually searching for the causes of possible latency degradations. Some embodiments include a graphical user interface, which makes it possible to graph latency distributions and include visual clues in the generated alerts, thus facilitating for system administrators and other users to find the causes and extents of the latency issues experienced by the system. The shorter lead time also provides more user satisfaction among the users of the distributed computing system and more timely response to production problems. Furthermore, a better understanding of the causal relationship among variables and components of the system can lead to better design of future systems and simplification of the latency monitoring mechanisms.

The details of one or more embodiments are set forth in the accompanying drawings and the description below. Other features and advantages will be apparent from the description and drawings, and from the claims.

DESCRIPTION OF DRAWINGS

FIG. 4 shows an exemplary latency email alert in accordance with one embodiment.

Like reference symbols in the various drawings indicate like elements.

DETAILED DESCRIPTION

Various embodiments include methods, apparatus, and systems for detecting causes of application latency degradations and/or other types of abnormalities, such as error rates, in large-scale distributed computing systems, and for generating appropriate alerts to system administrators or other individuals or entities that have an interest in the status of the application and computing system. The various embodiments will be described below by way of example with reference to a system and process that detects and reports latency degradations. It should however be realized that many variations are possible, within the various embodiments, as will be discussed in further detail below.

Figure 1:
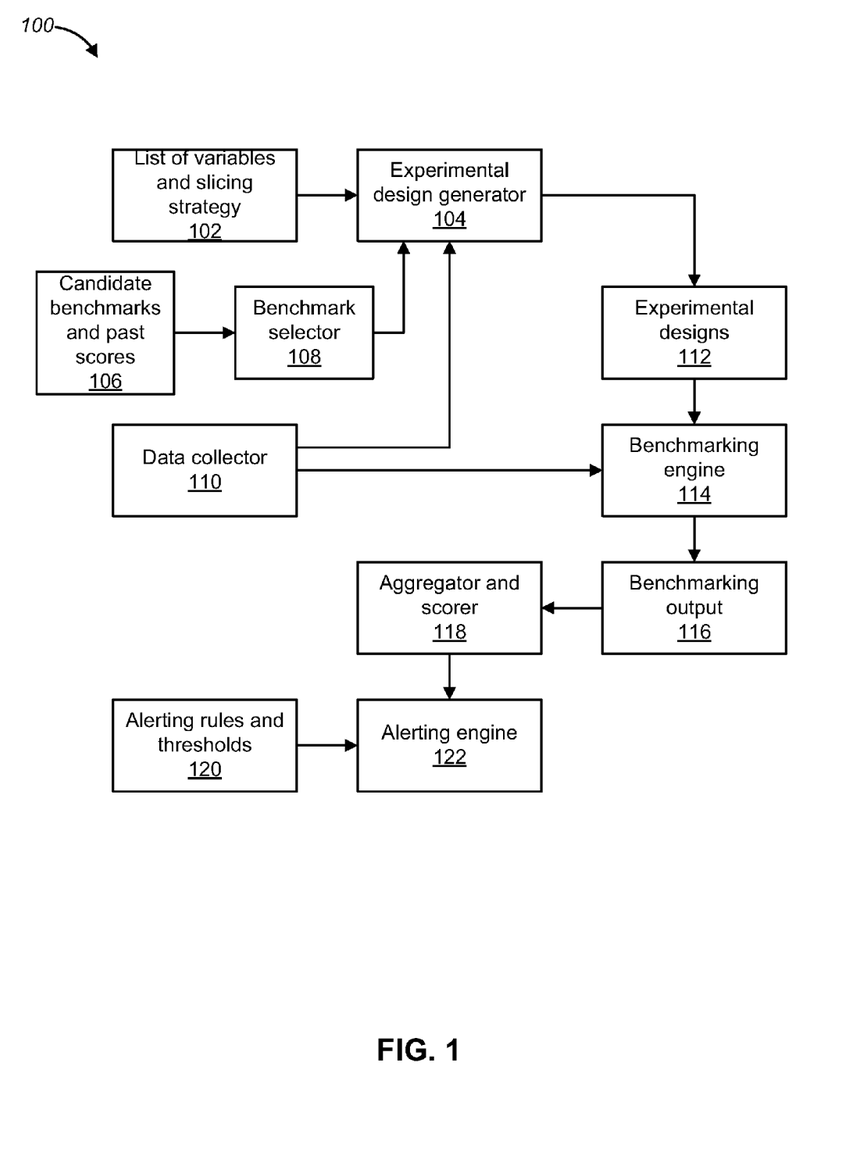
FIG. 1 shows a system for detecting latency in accordance with one embodiment.

As shown in FIG. 1, a system (100) for detecting application latency in accordance with one embodiment includes an experimental design generator (104), a benchmark selector (108), a data collector (110), a benchmarking engine (114), an aggregator and scorer (118) and an alerting engine (122). The operation of the system (100) will be discussed in detail below with reference to FIGS. 2-6, but first a brief overview of the different system components and their interactions will be explained in order to create an overview of how the system (100) operates in accordance with one embodiment.

The experimental design generator (104) receives a list of variables (102), benchmarks selected by the benchmark selector (108) from a set of candidate benchmarks and past scores (106), and data from the data collector (110). The variables in the list of variables are variables that are suspected to cause latency degradation and thus should be tested. A slicing strategy, which will be described below, defines how the variables in the list should be arranged in a search tree. As will also be seen below, this search tree is used during the latency detection to make an intelligent selection of which variable combinations to test and which variables to control, so as to avoid prohibitively expensive testing of every single possible variable value combination. The variables and the tree structure can be implemented, for example, as script files on the system (100).

The candidate benchmarks and past scores (106) collection contains results from previous tests performed on the system (100). From this collection, the benchmark selector (108) can select a past benchmark having the highest score over a certain time period (for example, the past several weeks before a current test is performed). The results from a current test of the system (100) can be compared with the selected past benchmark to identify latency degradations. Since all possible variable combinations are not available among the candidate benchmarks and past scores (106) (because previous tests have also used an intelligent selection of variables to test), the experimental design generator (104) "prunes" the tree, such that experimental designs are generated only if it is possible to compare their results with a past benchmark score. All other potential experimental designs are discarded by the experimental design generator (104).

The data collector (110) collects application latency data and is connected to a database (not shown) that can store and serve this data. The data collector (110) can be implemented, for example, on a server that examines system logs and stores pertinent data in a database. The data can be stored as flat files (possibly in some kind of proprietary format) or be stored in accordance with some kind of commercially available database solution. The database is continuously updated with real-time latency data collected by the data collector (110), so as to supply the database with the most recent system log data. That is, the logging of data occurs in (or near to) real time.

The experimental design generator (104) queries the data collector (110) to ensure that the distributions for the variables to be tested in the experiments is not empty, as this would render any experimental designs based on such variables meaningless. Based on the received data, the experimental design generator (104) generates a list of experimental designs (112) that will be used to test the application latency (100). Each experimental design contains a number of variables, where each variable has an assigned value. This list of experimental designs (112) is sent to the benchmarking engine (114). The benchmarking engine (114) processes the received experimental designs (112), once it has determined that sufficient data is available in the data collector (110), along with data from the data collector (110) to generate a benchmarking output (116).

In a typical scenario, the benchmarking output (116) may contain thousands or millions of results. In some embodiments, the results of each experimental design is a "Yes" (latency has increased) or a "No" (latency has not increased) result. Monitoring such a large number of results would be very difficult for a human user. Thus, the benchmarking output (116) is sent to the aggregator and scorer (118), where it is processed to generate an aggregated score that is easy for a human user to interpret. The results from the processing in the aggregator and scorer (118) are sent to the alerting engine (122). The alerting engine (122) also receives a set of alerting rules and thresholds (120), which in some embodiments are supplied by a human user, such as a system administrator. Based on the received data, the alerting engine (122) determines whether an alert for a system administrator (or other entity having interest in the health of the computing system) should be generated or not.

In some embodiments, the system (100) is also integrated with a graphical user interface, so that application latency distributions can be graphed, thereby allowing visual cues to be included in the alerts. This allows, for example, a graphical representation of the magnitude of latency changes, the proportion of queries affected, and so on.

A process (200) for identifying application latency degradation and generating alerts using the system (100), in accordance with one embodiment, will now be described with reference to FIG. 2. Typically the process (200) is used to compare a current application latency for a given application on a given system with a benchmark latency for the application from some past point in time, such as the same time of day a week earlier, to determine whether there are any significant changes in application latency.

Figure 2:
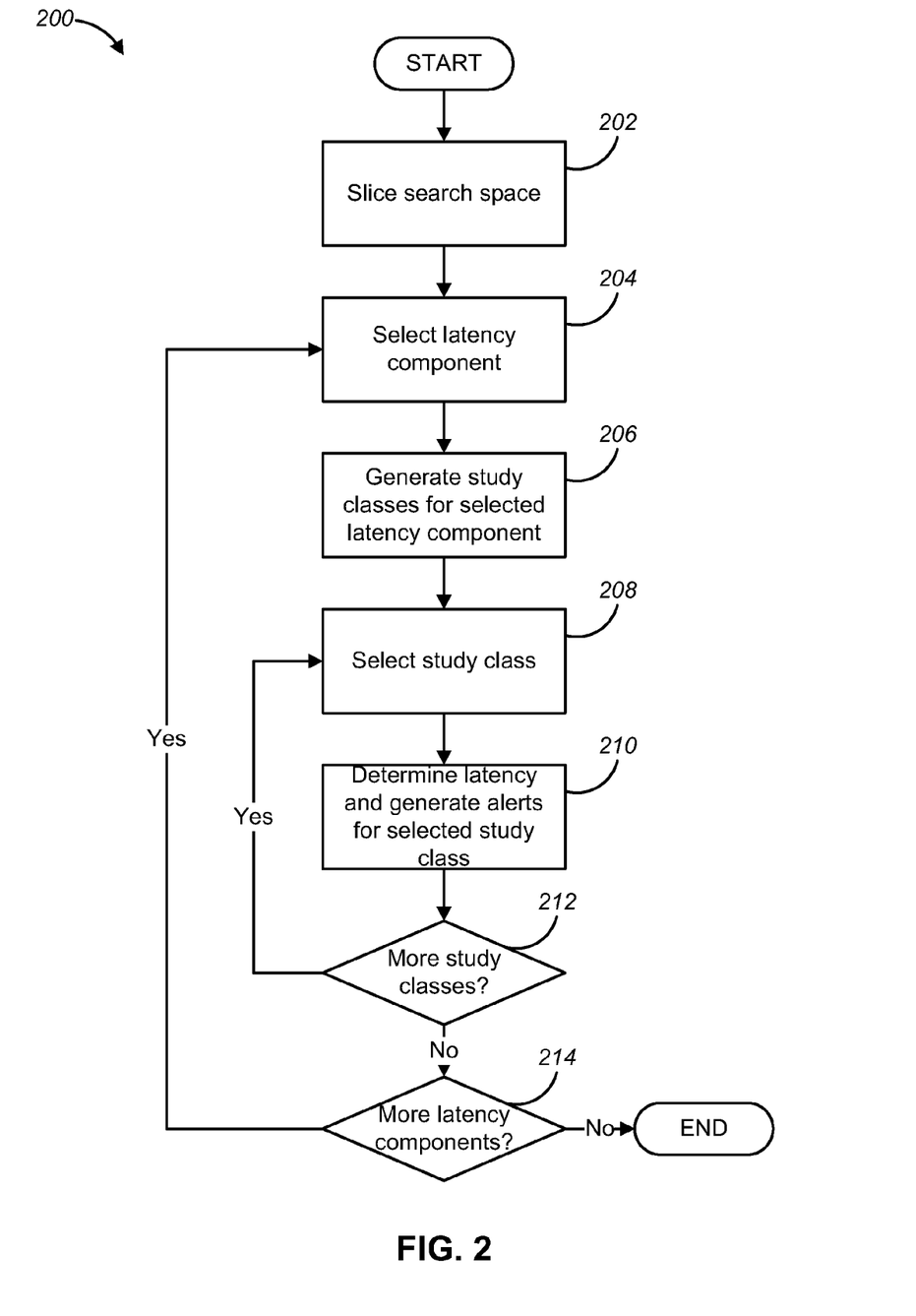
FIG. 2 shows a process (200) for identifying latency and generating alerts using the system (100) of FIG. 1, in accordance with one embodiment.

As can be seen in FIG. 2, the process (200) starts by slicing the search space (step 202). The search space is defined as the possible combinations of all the relevant variables that should be examined. In some embodiments, these variables of interests are selected by system administrators or other people who may have knowledge or experience about possible causes for latency degradations. For purposes of explanation, the size of the search space is denoted here by N. For instance, if there are five variables of interest, with each having ten possible values, then $N=10^5$, that is, 100,000 possibilities. There may be many more than five variables altogether, say 20 variables for example, but only the variables of interest constitute the search space.

The slicing of the search space occurs as follows. First, the total application latency is divided into three components, which are herein referred to as server latency, client latency and network latency, respectively. Server latency is latency that occurs on the server side as the servers are serving the queries. Client latency occurs on the users' computers, for example, as Javascript™ actions are performed. Network latency is latency that is incurred by the network. The network can be an external network (i.e., a network through which the users' computers communicate with the servers that serve the queries) or can be an internal network (i.e., a network that allows the various servers to communicate among themselves).

For purposes of explanation, it will be assumed that there are five variables, and only two of them are suspected to be relevant. These two potentially relevant variables have ten and five possible values, respectively. Thus the minimum size of the search space is N=50 (i.e., 5×10). This further assumes that only one value will be sampled for each of the remaining three variables that are not of any interest. If no such sampling was done, and the three remaining variables had ten possible values each, then the maximum size of the search space would be N=50*10*10*10=50,000.

The two variables that are believed to be the possible cause of latency degradation (alone or in combination) are enumerated, and used to form a search tree having 50 main branches. Each of the 50 branches is then augmented by generating control variables through sampling values of the remaining three variables (i.e., variables that are not suspected to be involved in the latency degradation). For example, if two values are sampled for each of the three remaining control variables, then the size of the search space is N=50*(2*2*2)=400, which is considerably smaller than the maximum size of N=50,000. In addition, by slicing the total latency into latency components, the "worst case scenario" for each latency component is smaller than if one were to consider all the variables together. For instance, in total there might be five variables with ten values each, that is, 100,000 potential combinations. Suppose, though, that for the server side latency only two variables are suspected to be relevant. Then, the best case for server side latency is a search space of a size of 100 (i.e., ten times ten), and the remaining three variables can be sampled. If the same is done with network latency components and client side latency components, the total search space size of (server latency+network latency+client latency) will be much smaller than 100,000, since for each latency type, the values of the control variables are only sampled instead of examining each and every possible combination.

Next, a latency component is selected (step 204). For explanatory purposes, it will be assumed that the server latency component is selected. However, it should be realized that the same principles also apply to other latency components. The server latency component is divided further into study classes (step 206). It is assumed here that the server latency space has four variables that can affect the server latency, alone or in combination. These four variables are (release, domain, cluster, user_action), and they are divided into three study classes; Study class I (release, user_action), Study class II (domain, user_action); and Study class III (cluster). Similar to the sub-search spaces above, the sum of the study class sub-search spaces is smaller than the original, undivided search space for the server latency space. As the skilled reader realizes, the number of study classes and the variables included therein can vary based on, for example, the particular application for which latency is tested.

Next, one of the study classes is selected (step 208). The selected study class is examined for latency degradations, and any necessary alerts are generated (step 210). This step will be explained in detail below with reference to FIG. 3. Once the selected study class has been examined for latency and appropriate alerts have been generated, it is checked whether there are any more classes within the selected latency component (step 212). If there are more classes, the process returns to step 208 and selects a different study class. If there are no more study classes, the process examines whether there are any more latency components (step 214). If there are more latency components, the process returns to step 204, where a new latency component is selected. If there are no more latency components to be examined, the process ends.

It should be noted that in some embodiments, the process (200) runs continuously while the system is operating, whereas in other embodiments, the process (200) runs on already collected data in the data collector (110) with a certain frequency, such as on a daily or weekly basis. In yet other embodiments, the process (200) runs at the request of a user or system administrator, for example, when some kind of abnormality in application latency is suspected. In some embodiments, instead of running in a loop and selecting the next latency component, study class, and so on, as shown in FIG. 2, the process (200) can run in parallel on multiple processors, where each processor processes a different latency component or study class, depending at what level the parallelizing occurs.

The step of determining latency and generate alerts (step 210 of FIG. 2) for the selected study class, in accordance with one embodiment will now be discussed in further detail with reference to FIG. 3. For explanation purposes, it is assumed that Study Class I for the Server Latency Component has been selected. As the skilled reader realizes, the process shown in FIG. 3 can also be applied in a similar fashion to the other study classes.

Figure 3:
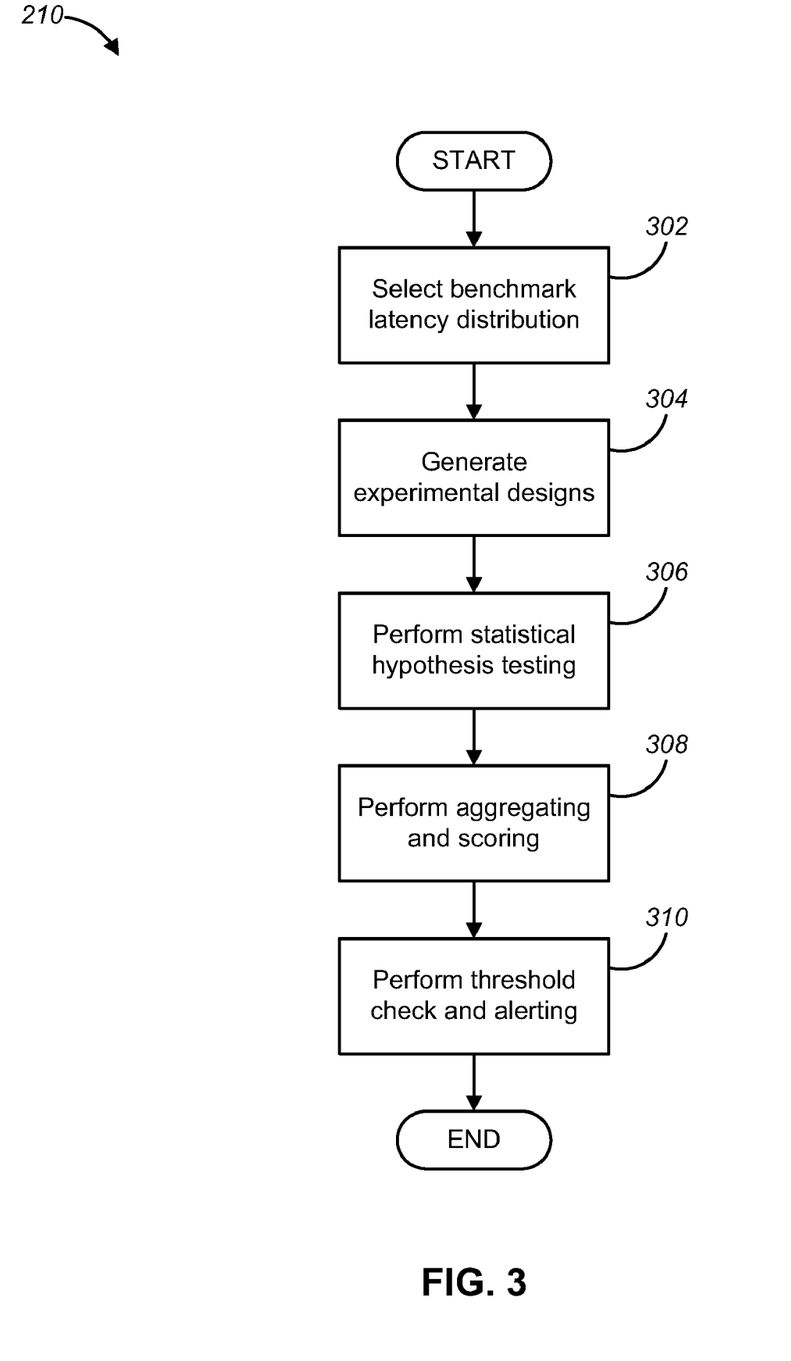
FIG. 3 shows a detailed description of step 210 of FIG. 2, in which latency is determined and alerts are generated for a selected study class, in accordance with one embodiment.

As can be seen in FIG. 3, the process starts by selecting a benchmark latency distribution (step 302). The main reason for using a distribution is that latency is not deterministic. Thus, a distribution can be used to represent the random/uncertain nature of latency, and improvements and degradations of latency, respectively, can be represented by a shift of the distribution as a whole. The selected benchmark latency distribution is associated with a particular release of the application being tested (or with some other variable, such as the same release, but a past date with a similar day of the week) and is a "past winner" that has a large number of requests. A "past winner" in this context is defined as a benchmark for which the smallest number of alerts were received and for which the latency degradation magnitude is the smallest. Furthermore, the "past winner" has an alert score—which will be described below—that is the lowest found among other latency distributions having large numbers of requests, within a certain time period. In one embodiment, the first benchmark distribution is selected manually and then, as subsequent test results come in, the benchmark distribution list is updated, so that benchmarks can be selected without human involvement for subsequent latency degradation studies.

In some embodiments, the studies are tracked in tree structures as described above, which allow easy organization of the studies. For example, as was described above, the tree was initially populated with latency components. For each latency component, branches are added to study classes. For each study class, studies are added. For each study, main variable values and sampled control variable values are added, and so on, until the tree is fully populated. The variable values associated with benchmark distribution (that is, the parameters used to describe unique benchmark distributions, such as {release=ABC, cluster=XXY, browser=IE7}), rather of the benchmark distributions themselves (that is, a collection of data/numbers that can be illustrated in a histogram or any other graphical depiction or use for compute means, variances, and so on) are also tracked in a tree structure for the same reason. With a set of parameters that describes a distribution, it is possible to query the data that makes up the distribution from the storage server/database. Optionally, it is also possible to make sure that the benchmark distribution candidates, that is, benchmark distributions that are associated with certain variable values, do not have average latency value more than X % above a certain reference distribution from the past. The reference distribution that is used for the comparison can be selected manually and be approved by operators or administrators of the system.

Next, experimental designs are generated for the study class (step 304). The experimental designs represent various "hypotheses" of variable combinations that may be possible causes of application latency degradations, augmented with control variables. To generate the experimental designs, first a set of main variables is created. In this example, the main variables constitute all possible value combinations of (release, latency class), where the latency class is the user_action variable. For instance, if the release variable has values (X, Y) and the user_action variable has values (A, B), there will be four main variable combinations: (release X, user_action A), (release X, user_action B), (release Y, user_action A) and (release Y, user_action B). These four combinations constitute the four potential explanations of the latency degradations in accordance with the hypothesis.

A set of control variables is also generated. The control variables are a sampling of the remaining variables related to server latency and Study Class I. In this case, the remaining variables are (domain, cluster). Here, it is assumed that the domain variable can have N different values (d1, d2, ..., dN) and that the cluster variable can have Z different values (c1, c2, ..., cZ). Thus, the number of potential control variable value combinations are N*Z. In some embodiments, only a subset of these control variable value combinations is selected through random sampling among the full set of control variable value combinations. For purposes of explanation of this example, it is assumed that the following five combinations are selected: (d1, c2), (d3, c4), (d10, c7), (d4, c100) and (d3, c4). Given that there are four main variable value combinations, and N*Z potential control variable value combinations, the maximum number of studies that would need to be performed without sampling is 4*N*Z. With the sampling decision, there will be 4*5=20 combinations, meaning that for each combination of main variable values, five different potential control variable value combinations are created, which will be used to determine whether the combination in question of main variable values is the explanation of the observed latency degradation.

Next, a statistical hypothesis testing is performed using the target distribution (i.e., the distributions that should be tested) and the benchmark distribution (step 306). In some embodiments, for each target variable combination, a benchmark variable combination is generated in order to be able to make a direct comparison. For example, if the target distribution is associated with variable values (release=x, user_action=a, cluster=y, domain=f), then the benchmark distribution will be associated with (release=equals(x), user_action=equals(a), cluster=equals(y), domain=equals(f)), where equals( ... ) is an equivalence function. For instance, release X and release Y can be said to be equal, since it is not desirable to require the release strings to be exactly the same on two different dates. In most cases, the equivalence function will literally mean that the two values are identical.

For each target value combination, and each benchmark value combination, data is collected and a latency distribution is formed. Thus, at the end of the data collection, there will be two directly comparable latency distributions, one for the benchmark data and one for the current measured values. There is a variety of different ways in which these distributions can be compared. Typically, some kind of parametric or non-parametric test is performed. In some embodiments, a (non-parametric) Kolmogorov-Smirnov test is used to compare the cumulative distribution functions (CDFs) of the two distributions and a (parametric) Student's t-test is used to compare the means of the two distributions. Both of these tests are well-known statistical tests to persons of ordinary skill in the art. A description of the Kolmogorov-Smirnov test can be found in, for example, William J. Conover (1971), Practical Nonparametric Statistics. New York: John Wiley & Sons. Pages 295-301 (one-sample Kolmogorov test), and pages 309-314 (two-sample Smirnov test). A description of the Student's t-test can be found in most introductory statistics textbooks, such as David Freedman, Robert Pisani, Roger Purves, Ani Adhikari (1991) Statistics 2nd ed., pages 442-448. Each of these tests will yield a Yes/No answer, which can subsequently be combined with "AND" or "OR" operations to reach a final vote for a particular experiment.

After the hypothesis testing, an aggregating and scoring operation is performed (step 308). As was described above, for each main variable combination or branch, there will be five possible control variable combinations. These control variable combinations will be used to determine whether the main variable combination indeed experiences a slowdown. Continuing the above example, it is assumed that the current aggregation and scoring operation is performed to determine whether there is a latency degradation associated with the main variable combination (release_X, user_action_A). As was described above, the control variables are (d1, c2), (d3, c4), (d10, c7), (d4, c100) and (d3, c4). Thus, there will be five studies to probe on this main variable combination: (release_X, user_action_A, d1,c2), (release_X, user_action_A, d3,c4), (release_X, user_action_A, d10,c7), (release_X, user_action_A, d4,c100), and (release_X, user_action_A, d3,c4). For the purpose of explanation, it is assumed that three out of these five studies discover a latency degradation (i.e., the vote is "Yes" when the Student's t-test and the Kolmogorov-Smirnov test, respectively, is applied). This gives the variable combination (release_X, user_action_A) a score of ⅗=60%.

Of course, as the skilled person realizes, there is a wide range of alternative scoring systems. For example, some embodiments can use the magnitude of latency degradation discovered in each study as weights for the votes. For instance, if the three studies that provides the 'Yes' result show that the mean latencies went up by 10%, 20% and 30%, then the score could be (10%+20%+30%))/5, or equal to 12%. This means that this branch of the tree, which has five studies generated, will at most generate one alert instead of five possible alerts. In some embodiments, the proportion or the number of requests related to the distribution is used as a weight, which makes it possible to highlight problems that affect a large number of users.

Finally, a threshold check and alerting are performed (step 310), which concludes step 210 of FIG. 2. In some embodiments, there are controls with which system users can specify the conditions for when to receive alerts. For instance, users can specify that if the latency increase is lower than 2% then no alerts should be generated.

In some embodiments, when an alert is generated, an email message is sent to the user. The email can optionally contain links to various graphs that represent the distributions being tested. Some emails also contain links to a dashboard. An example of such an email in accordance with one embodiment is shown in FIG. 4. As can be seen in FIG. 4, the email contains a header section (402) that informs the user that the email pertains to a latency alert for a specific server. Below the header is a summary section (404), which allows the user to obtain a quick overview of the system status, rather than having to go through each individual alert in the detailed list (406), located below the summary section (404). For example, the first line of the summary section (404) provides a summary of all the alarms which relate to the "compose" command and are listed in the detailed list (406). It should be noted that for illustrative purposes, the detailed list (406) only shows a small section of all the generated alerts, i.e., the alerts related to the "compose" operation, whereas in a real life scenario, the detailed list (406) would be considerably longer. As can be seen in the summary section (404) for the "compose" operation, a latency increase is indicated in 11 out of 17 studies, leading to a 65% probability of a latency increase. In the embodiment shown in FIG. 4, a weighted average is also computed to aid the person interpreting the results, as it allows alerts to be generated when the latency degradation is large enough, even when the probability alone is lower than a user-defined probability threshold for alerts. Of course, there are many other methods that can be used to aggregate the individual results too, as can be realized by those of ordinary skill in the art.

Figure 5:
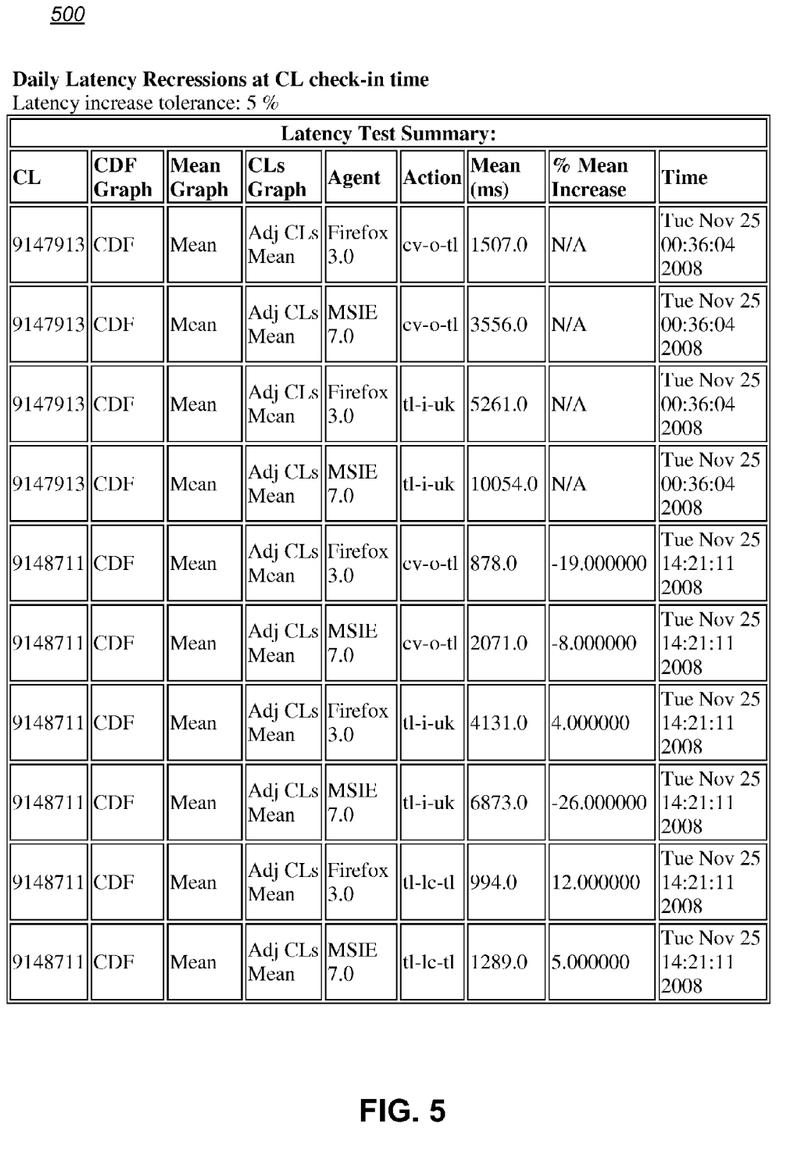
FIG. 5 shows a dashboard in accordance with one embodiment.

At the end of the summary section (404) of the email, there is a link, which the user can click to receive more details pertaining to the alarms. In response to clicking that link, the user is presented with a dashboard. An example of such a dashboard in accordance with one embodiment is shown in FIG. 5. As can be seen in FIG. 5, the dashboard (500) shows a listing of when the different tests where run, and details, such as the server's release number, the browser used, the action performed, the time at which the action was performed, and the mean time required for performing the action, as well as any increases in the mean time. This allows a user to "drill down" and find details about a specific set of variables.

Figure 6:
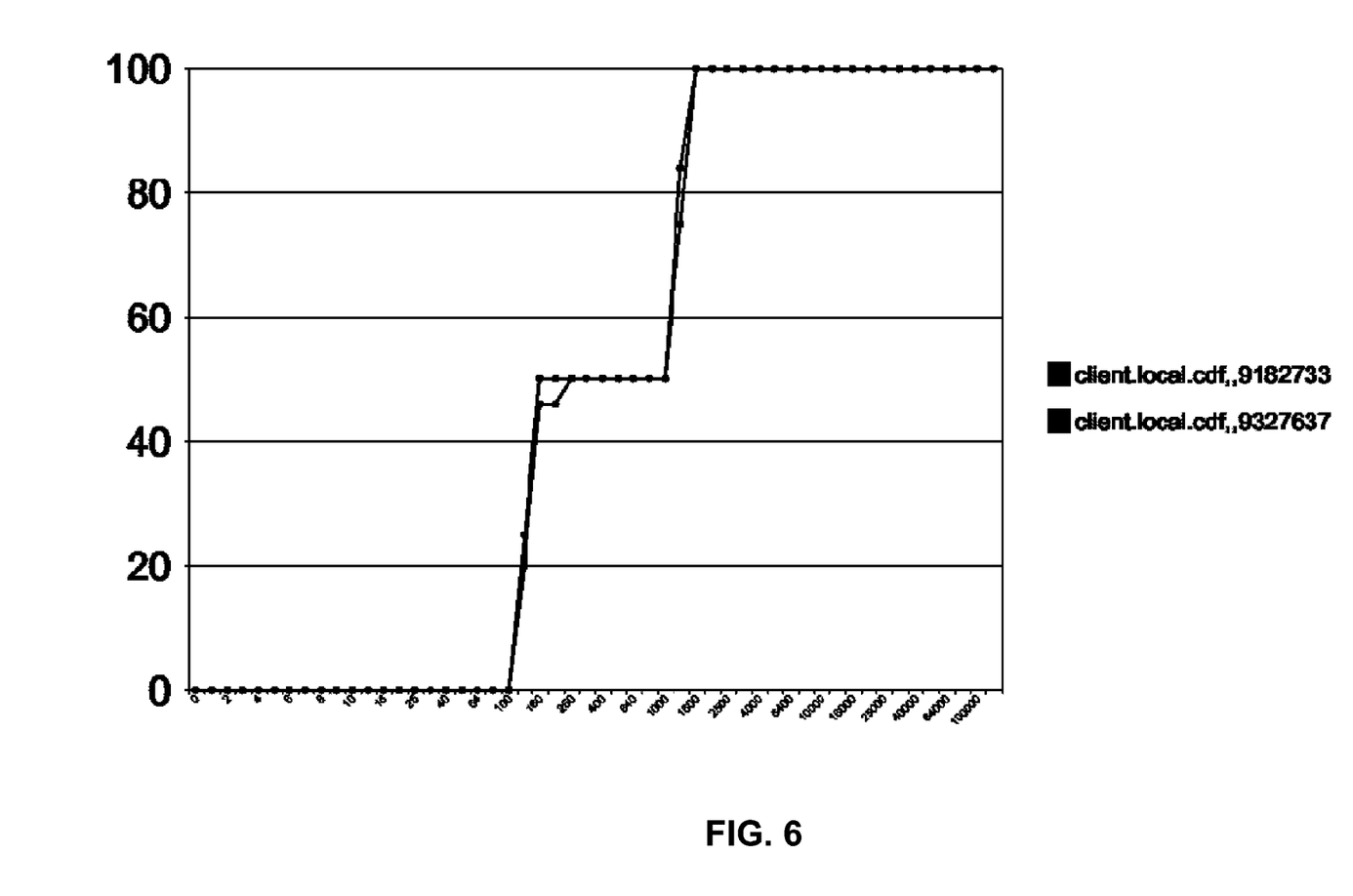
FIG. 6 shows a graphical representation of a latency test, in accordance with one embodiment.

In some embodiments, the user can also click various links in the dashboard (500) to get graphical representations of the data. This is illustrated in the dashboard (500) by the columns with the titles "CDF Graph" (Cumulative Distribution Function Graph) "Mean Graph," and "CLs Graph" (Change List Graph). FIG. 6 shows a graphical representation of a latency test—a CDF graph—in accordance with one embodiment. In FIG. 6, the latency values (in ms) are listed on the horizontal axis and the percentage of the experiments with latency values up to a certain value are listed on the vertical axis. Thus, the further to the left the graph is, the better are the results (i.e., shorter latency). One of the two graphs represents the tested values, and the other represents the corresponding benchmark values. This graph can assist a user with pinpointing where in the distribution a slowdown is experienced.

It should be realized that the above description is limited to a single example, and that there are many other variations that are possible within the scope of the various embodiments of the invention. Some of these alternatives will now be described.

In the above example, two stages were used for slicing the problem space. However, there can be N stages of slicing, with a sampling at each stage. Conversely, it is also possible to have a single-stage process, where control variables are not taken into consideration and a certain potential degradation in accuracy is accepted, and further investigations are performed only as a result of finding problems in this first stage.

The slicing scheme above (network, server, and client) is also just an example. In a practical application, the slicing scheme can be generalized as generic (A, B, C) (i.e., essentially any suitable criteria), and be applied to a wide range of other applications.

The sampling can of course be replaced with a complete enumeration, which is merely a special case (100%) of sampling. It is possible to drop some control variables, or make comparisons across different values. For instance, a user wants to know which browser is the slowest browser, then rather than having the same values for the browser variables in the target and benchmark distributions, the system can be forced to have different values.

The scoring system can be replaced with a ranking system, for example, if a user wants to use the system for other purposes, such as ranking browsers or clusters, for example. The statistical hypothesis testing framework that is used for benchmarking can be turned off, and instead only the tree search functionality can be used to generate the observations.

The tree search functionality can be turned off, and only the statistical hypothesis testing framework can be used. For example, if there is a suspicion that two specific distributions (with their corresponding parameter values) are different, then the search can be omitted since there is no longer a need to do a tree search, which serves to identify distributions that are different. Instead the benchmarking can be used to confirm the suspicion. So, in essence, this can be described as a manual search combined with benchmarking.

Various other benchmarking frameworks and alerting rules can be used, such as simple comparison of means (albeit less sophisticated), simple thresholding, and so on. Instead of integrating with a database that provides pre-collected data, it is possible to generate the definition of the studies a priori (that is, to come up with a list of the main and control variable values that should be collected) and pass this data requirement to a data collection component that subsequently collects only the necessary data.

Various embodiments of the invention can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various embodiments of the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network. The above-described devices and materials will be familiar to those of skill in the computer hardware and software arts.

It should further be noted that the various embodiments of the present invention employ various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The various embodiments of the present invention also relate to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations have been described. Nevertheless, it will be understood that various modifications may be made. For example, while the above system and methods have been described in terms of latency monitoring, it should be realized that the same techniques can be used for a variety of purposes. For example, one use is monitoring user quality, such as errors, based on how the application in question is behaving. Accordingly, other embodiments are within the scope of the following claims.

The invention claimed is:

1. A computer-implemented method for finding causes of a latency degradation in an application running on a distributed computing system, the method comprising:
   identifying a set of variables associated with the application and the distributed computing system, the set of variables including variables that are candidates for being responsible for latency degradation in the application or computing system;
   dividing a total latency into two or more latency components, wherein each latency component corresponds to a particular aspect of the total application latency;
   dividing each latency component into two or more study classes, wherein each study class includes a subset of the variables that are candidates for being responsible for latency degradation for the latency component; and
   for each study class:
      generating one or more combinations of the variables in the subset of the variables for that study class;
      determining a latency distribution for each of the one or more combinations of the variables;
      comparing, by at least one processor, the determined latency distributions for the one or more combinations with corresponding latency benchmark values for the same combinations to determine whether a degradation in latency distributions has occurred for particular combinations among the one or more combinations; and
      providing a result of the comparison to a user.

2. The method of claim 1, further comprising:
   generating an alert in response to determining that the degradation in latency for a particular combination exceeds a threshold value.

3. The method of claim 2, further comprising:
   aggregating multiple alerts to reduce the number of alerts; and
   presenting the aggregated alerts to the user.

4. The method of claim 1, wherein the latency components are based on features of the distributed computer system and include one or more of: server latency, client latency and network latency.

5. The method of claim 1, wherein the latency components are based on high-level operations that are supported by the application running on the distributed computer system.

6. The method of claim 1, wherein the one or more combinations include a set of main variables being suspected to be responsible for the latency degradation, and a set of control variables that constitute a sampling of values of the remaining variables in the study class.

7. The method of claim 6, further comprising:
   enumerating the one or more combinations; and
   selecting the control variables by performing a random sampling from all possible combinations of variable values.

8. The method of claim 1, wherein determining a latency includes:

selecting one or more benchmark distributions from a set of previously generated latency measurements for the one or more combinations; and performing latency measurements for the one or more combinations corresponding to the selected one or more benchmark distributions.

9. The method of claim 8, wherein the one or more benchmark distributions are past winners in a set of measurements for the one or more combinations during a prior time period.

10. The method of claim 1, wherein comparing the determined latency and the benchmark values is done using one or more of: a parametric test, and a non-parametric test.

11. The method of claim 10, wherein the one or more parametric and non-parametric tests include one or more of: a Kolmogorov-Smirnov test and a Student's T-test.

12. A computer program product, stored on a non-transitory machine-readable medium, for finding causes of a latency degradation in an application running on a distributed computing system, comprising instructions operable to cause a computer to:

identify a set of variables associated with the application and the distributed computing system, the set of variables including variables that are candidates for being responsible for latency degradation in the application or computing system;

divide a total latency into two or more latency components, wherein each latency component corresponds to a particular aspect of the total application latency;

divide each latency component into two or more study classes, wherein each study class includes a subset of the variables that are candidates for being responsible for latency degradation for the latency component; and for each study class:
generate one or more combinations of the variables in the subset of the variables for that study class;
determine a latency distribution for each of the one or more combinations of the variables;
compare the determined latency distributions for the one or more combinations with corresponding latency benchmark values for the same combinations to determine whether a degradation in latency distributions has occurred for particular combinations among the one or more combinations; and
providing a result of the comparison to a user.

13. The computer program product of claim 12, further comprising instructions operable to cause the computer to:
generate an alert in response to determining that the degradation in latency for a particular combination exceeds a threshold value.

14. The computer program product of claim 13, further comprising instructions operable to cause the computer to:
aggregate multiple alerts to reduce the number of alerts; and
present the aggregated alerts to the user.

15. The computer program product of claim 12, wherein the latency components are based on features of the distributed computer system and include one or more of: server latency, client latency and network latency.

16. The computer program product of claim 12, wherein the latency components are based on high-level operations that are supported by the application running on the distributed computer system.

17. The computer program product of claim 12, wherein the one or more combinations include a set of main variables being suspected to be responsible for the latency degradation, and a set of control variables that constitute a sampling of values of the remaining variables in the study class.

18. The computer program product of claim 17, further comprising instructions operable to cause the computer to:
enumerate the one or more combinations; and
select the control variables by performing a random sampling from all possible combinations of variable values.

19. The computer program product of claim 12, wherein determining a latency includes instructions to cause the computer to:
select one or more benchmark distributions from a set of previously generated latency measurements for the one or more combinations; and
perform latency measurements for the one or more combinations corresponding to the selected one or more benchmark distributions.

20. The computer program product of claim 19, wherein the one or more benchmark distributions are past winners in a set of measurements for the one or more combinations during a prior time period.

21. The computer program product of claim 12, wherein comparing the determined latency and the benchmark values is done using one or more of: a parametric test, and a non-parametric test.

22. The computer program product of claim 21, wherein the one or more parametric and non-parametric tests include one or more of: a Kolmogorov-Smirnov test and a Student's T-test.

23. A system for finding causes of a latency degradation in an application running on a distributed computing system, the system comprising:
at least one processor;
an experimental design generator operable by the at least one processor to:
identify a set of variables associated with the application and the distributed computing system, the set of variables including variables that are candidates for being responsible for latency degradation in the application or computing system;
divide a total latency into two or more latency components, wherein each latency component corresponds to a particular aspect of the total application latency;
divide each latency component into two or more study classes, wherein each study class includes a subset of the variables that are candidates for being responsible for latency degradation for the latency component; and
for each study class:
generate one or more combinations of the variables in the subset of the variables for that study class; and
determine a latency distribution for each of the one or more combinations of the variables;
and
a benchmarking engine operable by the at least one processor to:
for each study class, compare the determined latency distributions for the one or more combinations with corresponding latency benchmark values for the same combinations to determine whether a degradation in latency distributions has occurred for particular combinations among the one or more combinations; and
provide a result of the comparison to a user.

* * * * *